United States Patent
Jin et al.

(10) Patent No.: US 11,283,360 B2
(45) Date of Patent: Mar. 22, 2022

(54) CONVERTER

(71) Applicant: DELTA ELECTRONICS, INC., Taoyuan (TW)

(72) Inventors: Da Jin, Taoyuan (TW); Ya-Hong Xiong, Taoyuan (TW); Qing-Hua Su, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 16/542,326

(22) Filed: Aug. 16, 2019

(65) Prior Publication Data

US 2020/0076316 A1 Mar. 5, 2020

(30) Foreign Application Priority Data

Aug. 28, 2018 (CN) .......................... 201810988838.4

(51) Int. Cl.
  *H02M 3/335* (2006.01)
(52) U.S. Cl.
  CPC ............................... *H02M 3/33576* (2013.01)
(58) Field of Classification Search
  CPC ............. H02M 3/33576; H02M 1/083; H02M 3/3382; H02M 3/3378; H02M 3/337
  See application file for complete search history.

(56) References Cited

U.S. PATENT DOCUMENTS

| 4,383,292 | A | 5/1983 | Onodera et al. |
| 7,184,280 | B2 | 2/2007 | Sun et al. |
| 8,456,867 | B1 | 6/2013 | Karlsson et al. |
| 8,611,115 | B2 | 12/2013 | Figge et al. |
| 9,116,488 | B2 | 8/2015 | Shinohara |
| 9,621,053 | B1 | 4/2017 | Telefus |
| 10,177,669 | B1 * | 1/2019 | Chiu ..................... H02M 3/285 |
| 10,243,476 | B2 * | 3/2019 | Narita ............... H02M 3/33584 |
| 10,819,222 | B2 | 10/2020 | Scherbaum |
| 2005/0036340 | A1 | 2/2005 | Scarlatescu |
| 2009/0244934 | A1 * | 10/2009 | Wang ................ H02M 3/33592 363/21.06 |

(Continued)

FOREIGN PATENT DOCUMENTS

| CN | 101399492 A | 4/2009 |
| CN | 102035389 A | 4/2011 |

(Continued)

*Primary Examiner* — Kyle J Moody
(74) *Attorney, Agent, or Firm* — CKC & Partners Co., LLC

(57) ABSTRACT

A converter includes an input capacitor, a primary-side switch circuit, a magnetic element circuit, a secondary-side switch circuit, and an output capacitor. The magnetic element circuit includes a transformer and an inductor. The input capacitor is configured to receive an input voltage. The primary-side switch circuit is coupled to the input capacitor. The magnetic element circuit is coupled to the primary-side switch circuit. The inductor is a leakage inductor of the transformer or an external inductor coupled between the transformer and the primary-side switch circuit. The secondary-side switch circuit is coupled to the magnetic element circuit. The output capacitor is coupled to the secondary-side switch circuit. The input capacitor and the inductor generate an oscillating current. The primary-side switch circuit is switched at an adjacent region of a wave trough of the oscillating current.

22 Claims, 11 Drawing Sheets

(56) References Cited

U.S. PATENT DOCUMENTS

| | | | |
|---|---|---|---|
| 2010/0259951 A1* | 10/2010 | Adragna | H02M 3/337 363/17 |
| 2011/0069514 A1* | 3/2011 | Chiba | H02M 3/33569 363/21.02 |
| 2011/0194206 A1 | 8/2011 | Sase et al. | |
| 2012/0127761 A1* | 5/2012 | Halberstadt | H02M 3/337 363/21.02 |
| 2014/0268891 A1* | 9/2014 | Sigamani | H02M 3/285 363/17 |
| 2014/0286056 A1 | 9/2014 | Yoon et al. | |
| 2015/0138841 A1* | 5/2015 | Pahlevaninezhad | H02J 3/383 363/17 |
| 2015/0138844 A1* | 5/2015 | Karlsson | H02M 3/158 363/21.1 |
| 2016/0211690 A1* | 7/2016 | Li | H02M 3/33576 |
| 2016/0352236 A1* | 12/2016 | Yoo | H02M 3/33584 |
| 2016/0359419 A1 | 12/2016 | Lin et al. | |
| 2017/0070150 A1* | 3/2017 | Kim | H02M 1/42 |
| 2017/0179831 A1 | 6/2017 | Yu et al. | |
| 2017/0214330 A1* | 7/2017 | Yang | H01F 27/255 |
| 2017/0294844 A1 | 10/2017 | Nishijima | |
| 2018/0131285 A1 | 5/2018 | Stuler | |
| 2018/0138815 A1* | 5/2018 | Yamada | G05F 1/565 |
| 2020/0099309 A1* | 3/2020 | Jin | H02M 3/33569 |

FOREIGN PATENT DOCUMENTS

| | | |
|---|---|---|
| CN | 103532390 A | 1/2014 |
| CN | 104428985 A | 3/2015 |
| CN | 104467443 A | 3/2015 |
| CN | 103312171 B | 4/2016 |
| CN | 105811779 A | 7/2016 |
| CN | 105991037 A | 10/2016 |
| CN | 106208709 A | 12/2016 |
| CN | 106664016 A | 5/2017 |
| CN | 103887976 B | 6/2017 |
| CN | 107769563 A | 3/2018 |
| EP | 2458723 A1 | 5/2012 |
| TW | 201246774 A | 11/2012 |

* cited by examiner

CONVERTER

RELATED APPLICATIONS

This application claims priority to China Application Serial Number 201810988838.4, filed Aug. 28, 2018, which is herein incorporated by reference.

BACKGROUND

Field of Invention

The present disclosure relates to a voltage conversion device. More particularly, the present disclosure relates to a converter.

Description of Related Art

In order to increase the efficiency of a conversion system, a bus converter usually uses an unadjusted scheme of 54V to 12V. The switch operates at a fixed duty ratio, for example, the maximum duty ratio, so that the advantages of minimum current effective value, smallest filter can be obtained. The circuit topology commonly used for the above bus converter has a full bridge circuit on its primary side, and a center tap full wave rectifier circuit on its secondary side.

The above bus converter belongs to a traditional pulse width modulation (PWM) switch circuit which has a large switching loss. The reverse recovery loss of the full wave rectifier switching transistor is also large, and thereby the switching frequency of the converter is excessively low. A higher switching frequency can not be adopted to shrink the size of the transformer, and the output inductor is also bulky. Additionally, in traditional applications, the air gap of the transformer is reduced as much as possible to decrease the loss caused by the magnetizing current of the transformer. The value of the magnetizing inductance is thus close to infinity, which makes the voltage across the switch high when the switch is turned on, and thereby the turn-on loss is large.

For the foregoing reasons, there is a need to solve the above-mentioned problems by providing a converter, which satisfies the needs for high efficiency and high power density of a converter.

SUMMARY

The foregoing presents a simplified summary of the disclosure in order to provide a basic understanding to the reader. This summary is not an extensive overview of the disclosure and it does not identify key/critical elements of the present disclosure or delineate the scope of the present disclosure. Its sole purpose is to present some concepts disclosed herein in a simplified form as a prelude to the more detailed description that is presented later.

A converter for converting power from an input source to a load is provided. The converter comprises an input capacitor, a primary-side switch circuit, a magnetic element circuit, a secondary-side switch circuit, and an output capacitor. The magnetic element circuit comprises a transformer and an inductor. The input capacitor is configured to receive an input voltage from the input source. The primary-side switch circuit is coupled to the input capacitor comprising a plurality of switches. The magnetic element circuit is coupled to the primary-side switch circuit. The inductor is a leakage inductor of the transformer or an external inductor coupled between the transformer and the primary-side switch circuit. The secondary-side switch circuit is coupled to the magnetic element circuit. The output capacitor is coupled to the secondary-side switch circuit. The input capacitor and the inductor oscillate to generate an oscillating current. The at least one switch of the primary-side switch circuit is turned off at an adjacent region of a wave trough of the oscillating current.

The disclosure provides an apparatus for converting power comprising at least two converters as defined above. Primary-side switch circuits of the at least two converters are coupled in series or in parallel, and secondary-side switch circuits of the at least two converters are coupled in series or in parallel. At least two drive signals for respectively driving the at least two converters are in phase or out of phase by 90 degrees.

The disclosure provides a converter for converting power from an input source to a load. The converter comprises an input capacitor, a primary-side switch circuit, a magnetic element circuit, a secondary-side switch circuit, and an output capacitor. The magnetic element circuit comprises a transformer and an inductor. The input capacitor is configured to receive an input voltage from the input source. The primary-side switch circuit is coupled to the input capacitor and comprising a plurality of switches. The magnetic element circuit is coupled to the primary-side switch circuit. The inductor is a leakage inductor of the transformer or an external inductor coupled between the transformer and the primary-side switch circuit. The secondary-side switch circuit is coupled to the magnetic element circuit. The output capacitor is coupled to the secondary-side switch circuit. The input capacitor and the inductor oscillate to generate an oscillating current by turning on and turning off the primary-side switch circuit. An oscillating frequency of the oscillating current is n times a switching frequency of the primary-side switch circuit, wherein a range of n is from $(2m+1.5)$ to $(2m+2.5)$, $m \geq 0$, and m is an integer.

The disclosure provides an apparatus for converting power comprising at least two converters as defined above. Primary-side switch circuits of the at least two converters are coupled in series or in parallel, and secondary-side switch circuits of the at least two converters are coupled in series or in parallel. At least two drive signals for respectively driving the at least two converters are in phase or out of phase by 90 degrees.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

According to the usual mode of operation, various features and elements in the figures have not been drawn to scale, which are drawn to the best way to present specific features and elements related to the disclosure. In addition, among the different figures, the same or similar element symbols refer to similar elements/components.

DESCRIPTION OF THE EMBODIMENTS

To make the contents of the present disclosure more thorough and complete, the following illustrative description is given with regard to the implementation aspects and embodiments of the present disclosure, which is not intended to limit the scope of the present disclosure. The features of the embodiments and the steps of the method and their sequences that constitute and implement the embodiments are described. However, other embodiments may be used to achieve the same or equivalent functions and step sequences.

Unless otherwise defined herein, scientific and technical terminologies employed in the present disclosure shall have the meanings that are commonly understood and used by one of ordinary skill in the art. Unless otherwise required by context, it will be understood that singular terms shall include plural forms of the same and plural terms shall include the singular. Specifically, as used herein and in the claims, the singular forms "a" and "an" include the plural reference unless the context clearly indicates otherwise.

As used herein, "couple" refers to direct physical contact or electrical contact or indirect physical contact or electrical contact between two or more elements. Or it can also refer to reciprocal operations or actions between two or more elements.

Figure 1:
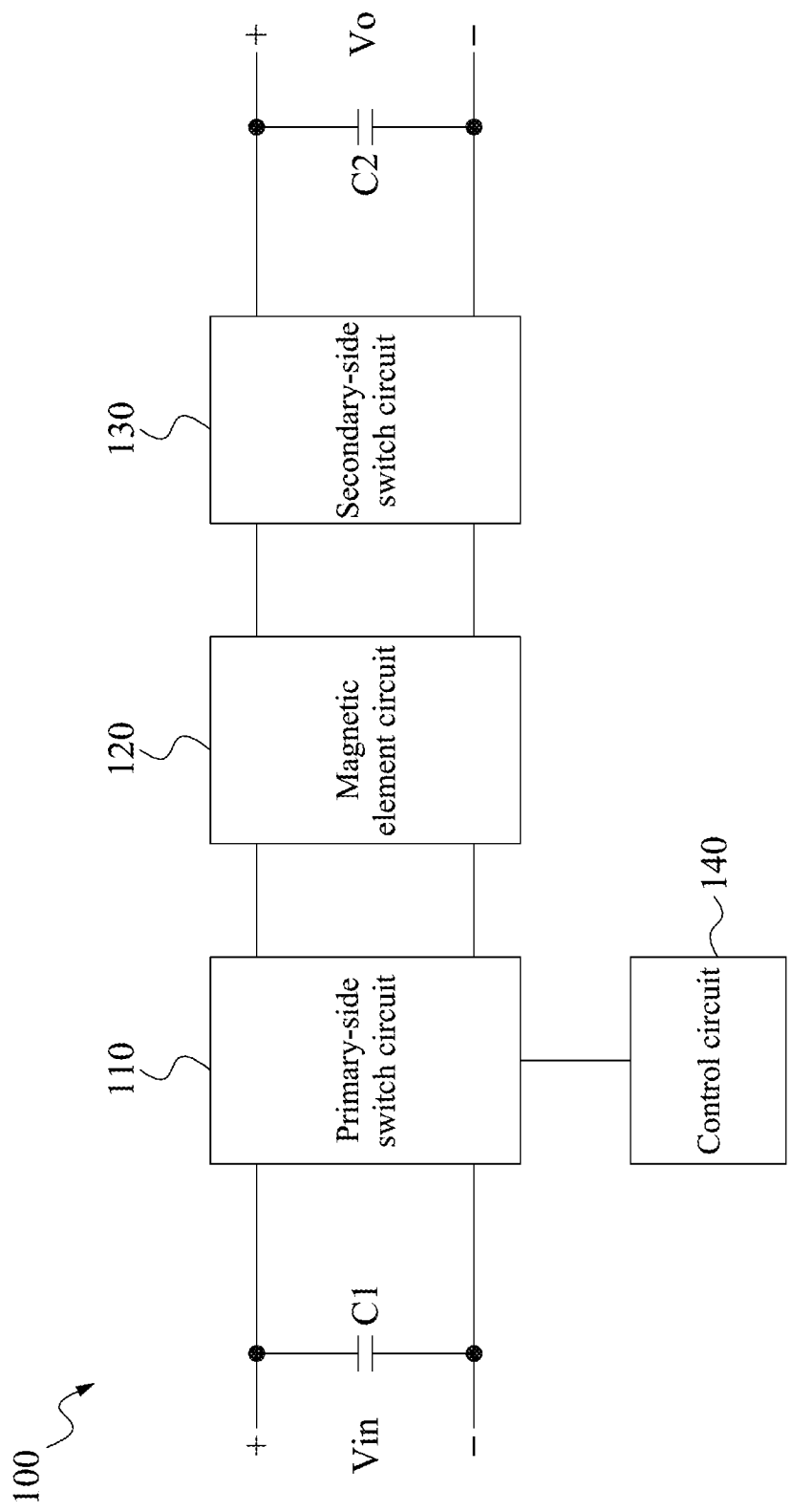
FIG. 1 depicts a block schematic diagram of a circuit of a converter according to one embodiment of the present disclosure.

FIG. 1 depicts a block schematic diagram of a circuit of a converter 100 according to one embodiment of the present disclosure. As shown in the figure, the converter 100 includes an input capacitor C1, a primary-side switch circuit 110, a magnetic element circuit 120, a secondary-side switch circuit 130, and an output capacitor C2. In addition, a transformer of the magnetic element circuit 120 includes an inductor (which will be described with reference to the following figures).

As shown in FIG. 1, the primary-side switch circuit 110 is coupled to the input capacitor C1. The magnetic element circuit 120 is coupled to the primary-side switch circuit 110. The secondary-side switch circuit 130 is coupled to the magnetic element circuit 120. The output capacitor C2 is coupled to the secondary-side switch circuit 130.

The input capacitor C1 is configured to receive an input voltage Vin. The input capacitor C1 and the inductor in the magnetic element circuit 120 oscillate to generate an oscillating current. The primary-side switch circuit 110 is switched at an adjacent region of a wave trough of the oscillating current. Relevant operations are provided in detail with reference to the following FIG. 2 and FIG. 3.

Figure 2:
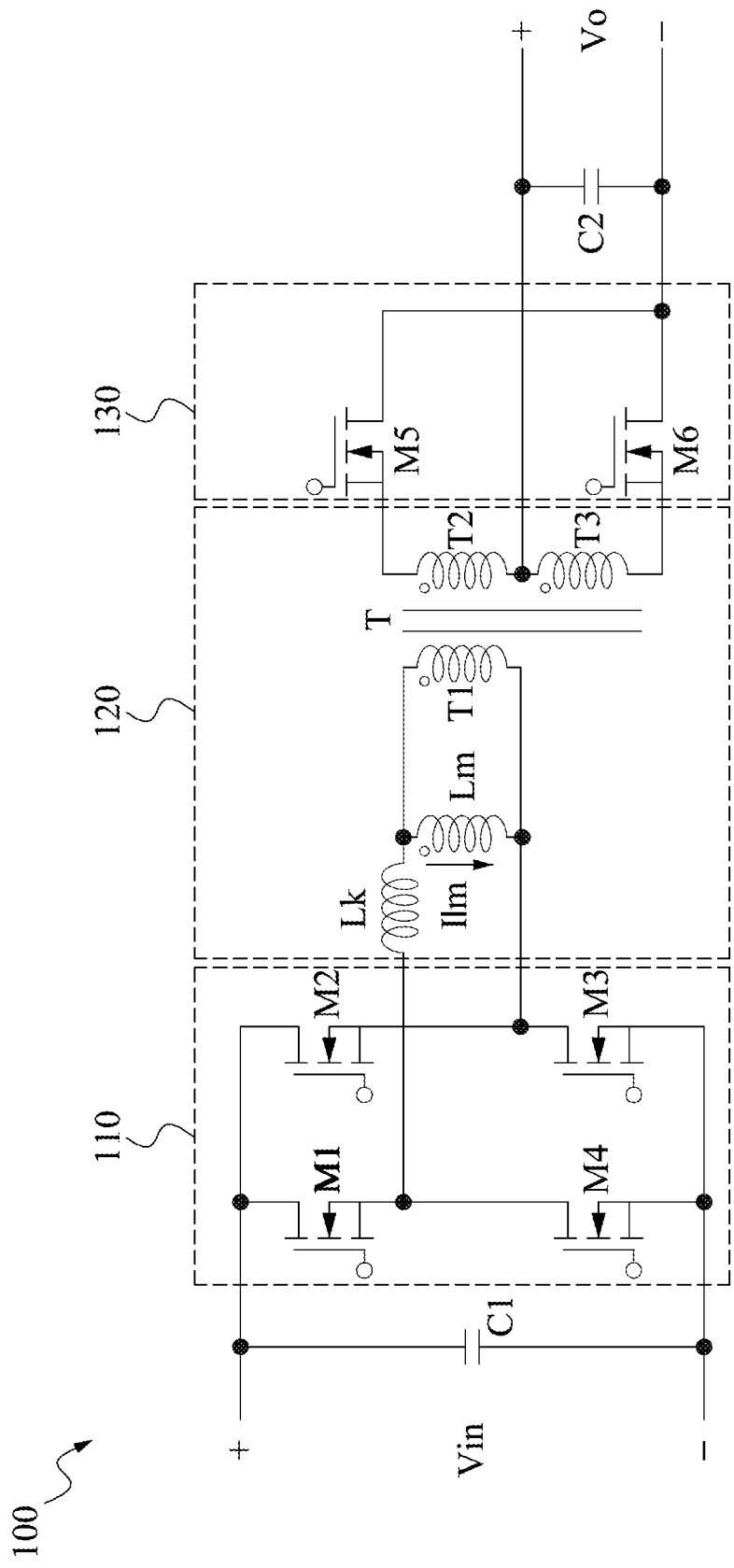
FIG. 2 depicts a schematic diagram of a circuit of a converter according to one embodiment of the present disclosure.

FIG. 2 depicts a schematic diagram of a circuit of a converter 100 according to one embodiment of the present disclosure. As shown in the figure, the primary-side switch circuit 110 is implemented by using a full bridge switch circuit, and the secondary-side switch circuit 130 is implemented by using a full wave rectifier circuit. The secondary-side winding of the transformer of the magnetic element circuit 120 includes at least two windings T2, T3 connected in series and a center tap existed in a connection point between the at least two windings T2, T3. The secondary-side winding and the secondary-side switch circuit 130 form a center-tap full wave rectifier circuit. Additionally, the magnetic element circuit 120 includes at least one inductor which may be a leakage inductor Lk of the transformer of the magnetic element circuit 120. According to the present embodiment, a capacitance value of the input capacitor C1 is adjusted depending on practical needs so that the input capacitor C1 and the leakage inductor Lk can operate to generate the oscillating current. However, the present disclosure is not limited to the structure shown in FIG. 2, which is only used to illustrate one of the implementation methods of the present disclosure by taking an example.

Figure 3:
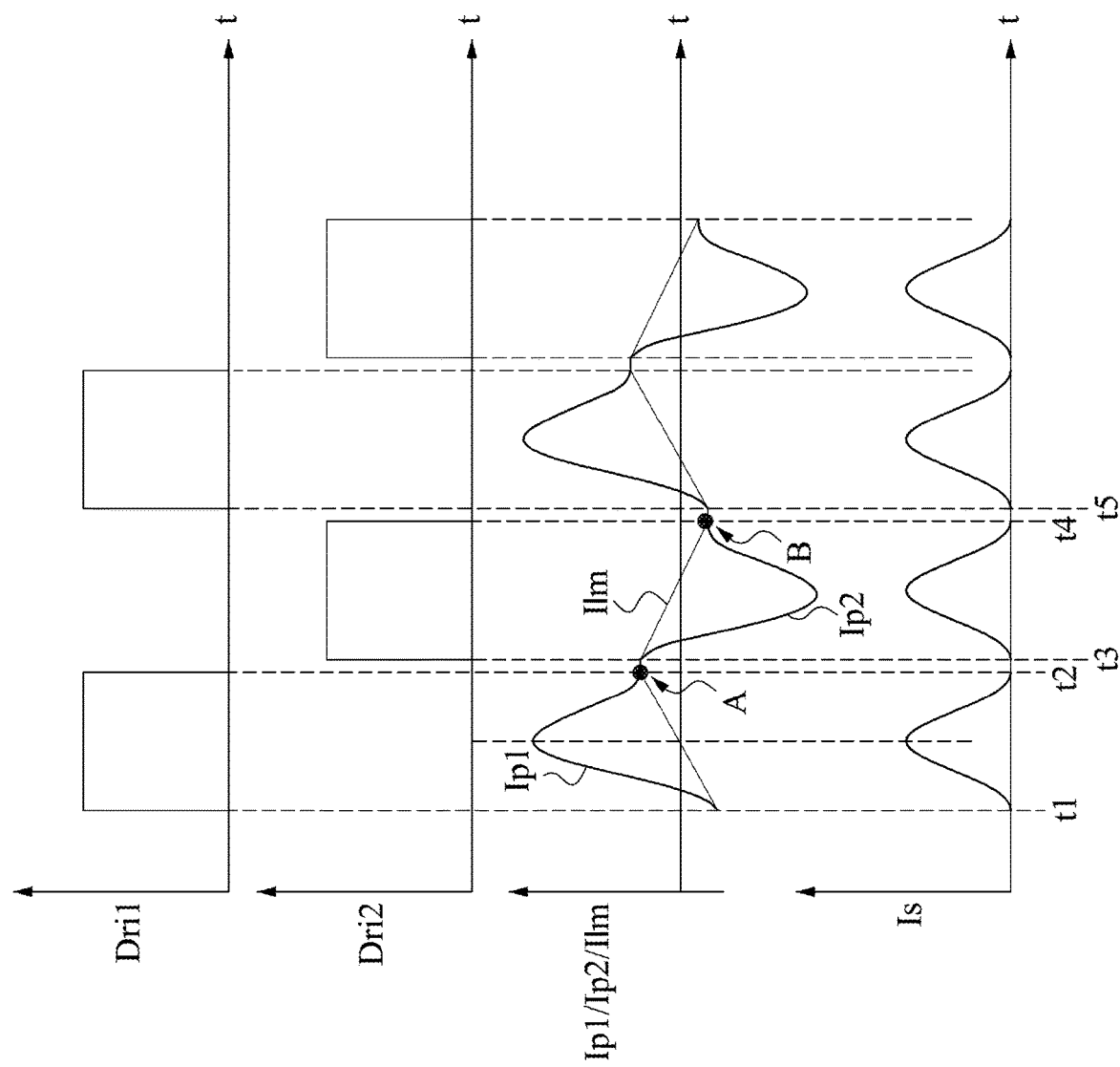
FIG. 3 depicts a control waveforms diagram of a converter according to one embodiment of the present disclosure.

Please refer to FIG. 2 and FIG. 3. FIG. 3 depicts a control waveforms diagram of the converter 100 according to one embodiment of the present disclosure. As shown in the figure, a drive signal Dri1 is configured to drive switches M1, M3 of the primary-side switch circuit 110 and a switch M5 of the secondary-side switch circuit 130. A drive signal Dri2 is configured to drive switches M2, M4 of the primary-side switch circuit 110 and a switch M6 of the secondary-side switch circuit 130. According to the present embodiment, through reducing the capacitance value of the input capacitor C1, the input capacitor C1 and the leakage inductor Lk are able to operate to generate the oscillating current during the interval t1-t2 and t3-t4. For example, during the interval t1-t2, the drive signal Dri1 having a high level is used for turning on the switches M1, M3 and M5, the input capacitor C1 and the leakage inductor Lk oscillate to generate an oscillating current Ip1. The oscillating current Ip1 is a current flowing through switches of the primary-side switch circuit 110.

As shown in the FIG. 3, when the oscillating current Ip1 falls to a point A at a trough at time t2, the switching is performed. The drive signal Dri1 is switched to a low level signal, and thereby the switches M1, M3, and M5 are turned off. This time point t2 is also where the oscillating current Ip1 is substantially adjacent to (close to) a current Ilm of a magnetizing inductor Lm of the transformer.

During the interval t3-t4, the drive signal Dri2 having the high level signal is used for turning on the switches M2, M4, M6, and the input capacitor C1 and the leakage inductor Lk oscillate to generate an oscillating current Ip2. The oscillating current Ip2 is a current flowing through switches of the primary-side switch circuit 110. When the oscillating current Ip2 falls to a point B at a trough at time t4, the switching is performed. The drive signal Dri2 is switched to the low level signal, and the switches M2, M4, and M6 are turned off. This time point t4 is also where the oscillating current Ip2 is substantially adjacent to the current Ilm of the magnetizing inductor Lm of the transformer.

Based on the above operating methods, and referring to the FIG. 3 again, the waveform of a secondary-side current Is is shown as a full wave rectified wave. As a result, a current surge that is instantaneously generated when the switches are switched (for example, the switches are turned on) is eliminated to effectively reduce the turn-on loss. Moreover, the switches can be turned off when the oscillating currents Ip1, Ip2 of the primary-side switch circuit 110 is substantially close to the current Ilm of the magnetizing inductor Lm, thus making the turn-off loss of the switches small.

A description is provided with reference to FIG. 2. In one embodiment, the transformer of the magnetic element circuit 120 includes at least one magnetic core, at least one primary-side winding T1, and the at least one secondary-side winding including the at least two windings T2, T3. The at least one primary-side winding T1 is coupled to the primary-side switch circuit 110. The at least two windings T2, T3 are coupled to the secondary-side switch circuit 130. The at least one primary-side winding T1 and the at least two windings T2, T3 are coupled through the at least one magnetic core.

Referring to FIG. 1 and FIG. 3, in another embodiment, the converter 100 further includes a control circuit 140 as shown in FIG. 1. The control circuit 140 is configured to generate a set of complementary drive signals (such as the drive signals Dri1, Dri2) shown in FIG. 3 so as to drive the primary-side switch circuit 110. A duty cycle of each of the above set of complementary drive signals is about 50% (for example, a duty ratio of the drive signal Dri1 is about 50%). In one embodiment, dead times (such as intervals t2-t3 and t4-t5) exist between the complementary drive signals. The duration of the interval t1-t5 is a switch period of the converter 100.

In still another embodiment, the present embodiment controls an oscillating frequency of the oscillating current (such as the oscillating current Ip1), so that the oscillating frequency of the oscillating current is n times a switching frequency fsw. The range of n is [2m+1.5, 2m+2.5], here m≥0, and m is an integer.

In one embodiment, n is an even number greater than zero.

A relationship between the capacitance value of input capacitor C1, an oscillating frequency fr of the oscillating current and an inductance value of the leakage inductor Lk of the transformer is as follows:

$$C1 = \frac{1}{Lk(2\pi fr)^2} \quad \text{Formula 1}$$

Since the capacitance value of input capacitor C1 is effectively reduced according to the present embodiment, the input capacitor C1 can oscillate with the leakage inductor Lk of the transformer to generate the required oscillating current. By using the input capacitor C1 as an oscillating capacitor, the input capacitor C1 can filter and generate the oscillating current at the same time. The input capacitor C1 with a small capacitance has a small volume and a low cost, which can further increase the power density of the converter and reduce the cost of the converter. In one embodiment, because a current flowing through the input capacitor C1 is a difference between an equivalent load current and an input current, a loss generated on the input capacitor C1 is correspondingly very small because of the low effective value of a capacitor current.

Figure 4:
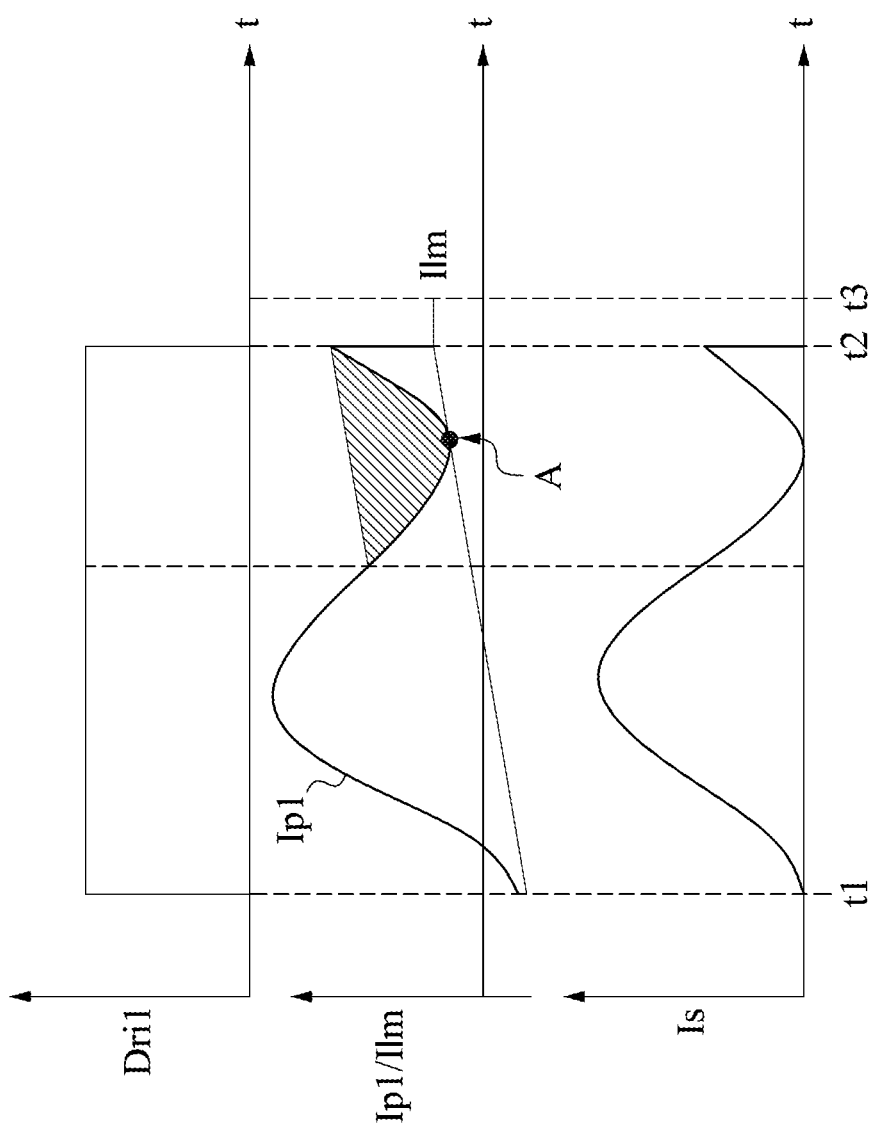
FIG. 4 depicts a control waveforms diagram of a converter according to another embodiment of the present disclosure.

FIG. 4 depicts a control waveforms diagram of a converter 100 according to another embodiment of the present disclosure. As shown in the figure, the switches M1, M3, M5 can be turned off when the oscillating current Ip1 oscillates adjacent to (close to) the point A at the trough. In more detail, the set of switches M1, M3, M5 can be turned off when the oscillating current Ip1 enters a shaded area adjacent to the point A at the trough. In one embodiment, the interval of the above representative shaded area adjacent to the trough has a duration which is a half of the oscillating period, and the point A at the trough is located at a midpoint of the interval. The switches M2, M4, M6 can also be turned off when the oscillating current Ip2 oscillates adjacent to the point B at the trough to achieve the similar function. In one embodiment, the point B at the trough of the oscillating current Ip1 can be located at a midpoint of an adjacent region (such as a hatched region), and an interval of the adjacent region (such as an interval of the hatched region) has a duration which is a half of the oscillating period (such as the interval t1-t2) of the oscillating current Ip1.

Figure 5:
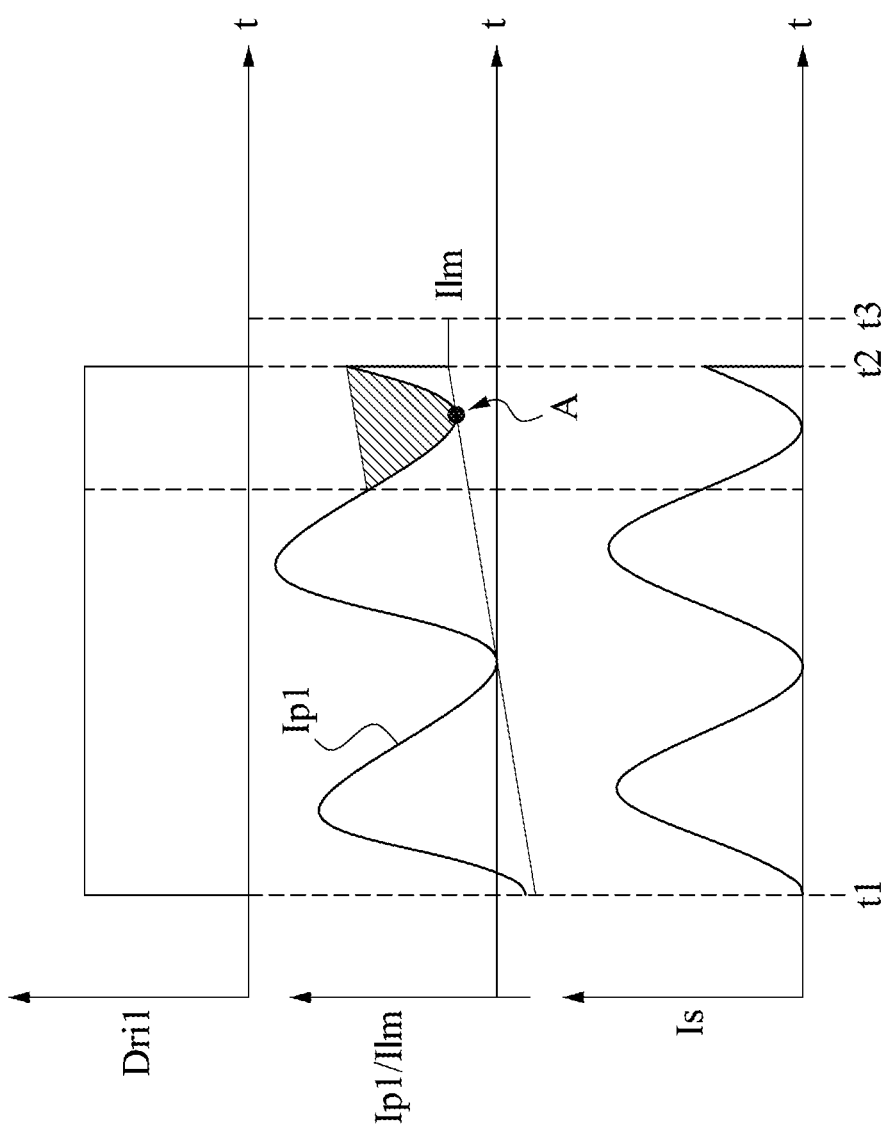
FIG. 5 depicts a control waveforms diagram of a converter according to still another embodiment of the present disclosure.

FIG. 5 depicts a control waveforms diagram of a converter 100 according to still another embodiment of the present disclosure. As shown in the figure, the switches M1, M3, M5 can be turned off when the oscillating current Ip1 oscillates adjacent to the point A at a second trough or even an nth trough. As shown in the figure, the oscillating current Ip1 enters a shaded area adjacent to the point A at the second trough, then the switches M1, M3, and M5 can be turned off. In more detail, the set of switches M1, M3, M5 can be turned off when the oscillating current Ip1 enters the shaded area adjacent to the point A at the trough. An interval of the above representative shaded area adjacent to the trough has a duration which is a half of the oscillating period, and the point A at the trough is located at a midpoint of the interval. Similarly, the converter 100 can also turn off the switches M2, M4, M6 when the oscillating current Ip2 oscillates adjacent to the point B at the second trough or even the nth trough to achieve the similar function.

Figure 6:
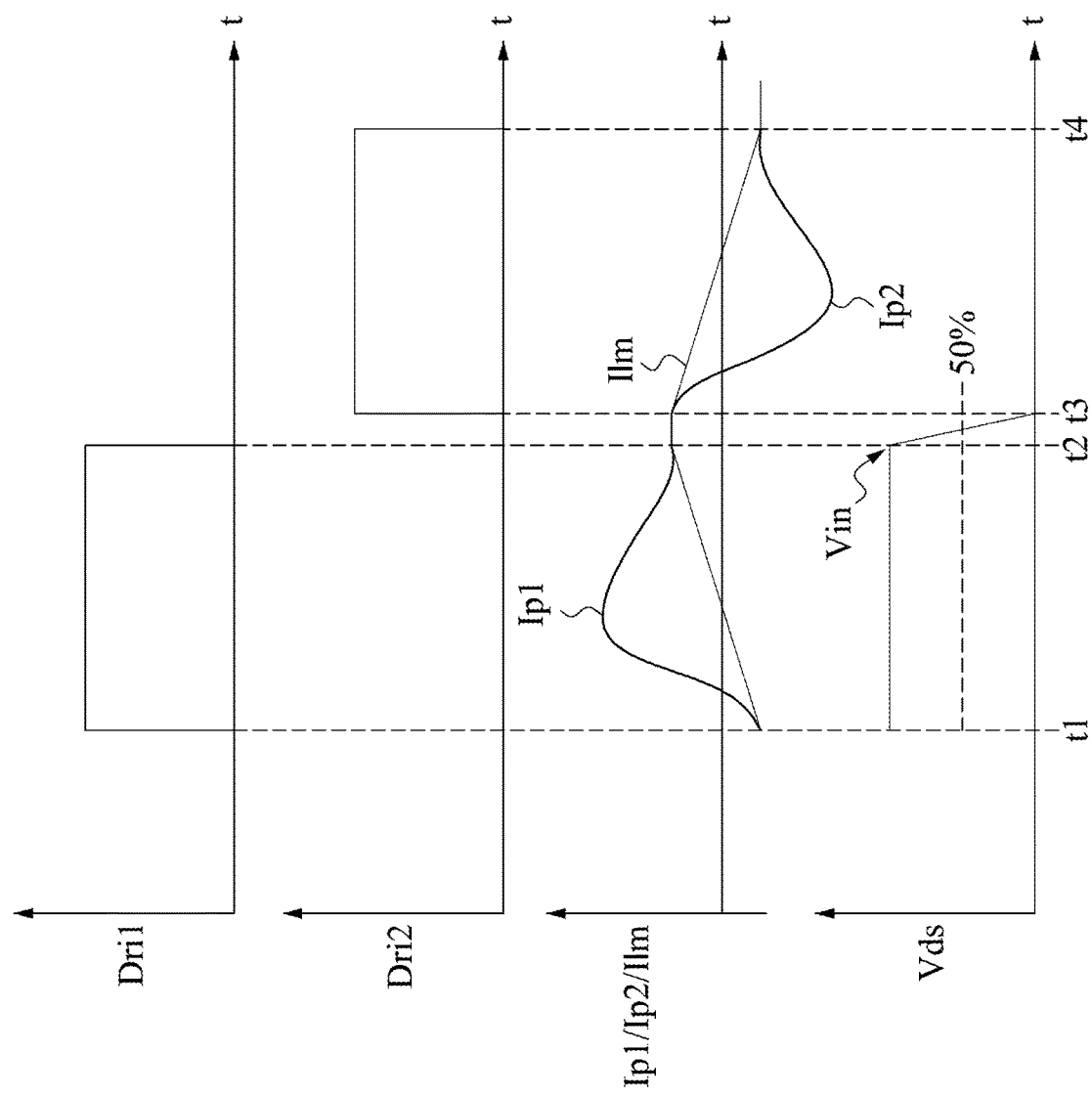
FIG. 6 depicts a control waveforms diagram of a converter according to yet another embodiment of the present disclosure.

FIG. 6 depicts a schematic diagram of drive waveforms of a converter 100 according to yet another embodiment of the present disclosure. Referring to FIG. 1, FIG. 2 and FIG. 6, the converter 100 further includes the control circuit 140 which is coupled to the primary-side switch circuit 110. When a voltage across a switch of the primary-side switch circuit 110 is less than or equal to half of the input voltage Vin, the control circuit 140 controls the primary-side switch circuit 110 to transfer its state. In one embodiment, the current Ilm of the magnetizing inductor Lm shown in FIG. 2 can be adjusted through adjusting an air gap of the converter 100. In one embodiment, in the interval t2-t3, the current Ilm of the magnetizing inductor Lm extracts charges on parasitic capacitors of switches of the primary-side switch circuit 110 in another set of switches (such as the switches M2 and M4), so that a drain-source voltage Vds across these switches drops until the drain-source voltage is less than or equal to half of the input voltage Vin. At this time, the another set of switches (such as the switches M2 and M4) of primary-side switch circuit 110 is turned on. As a result, the turn-on loss of the switches can be reduced, and the energy conversion efficiency and power density of the converter 100 can be improved. In another embodiment, the control circuit 140 controls the primary-side switch circuit 110 to transfer its state (for example, the control circuit 140 generates the drive signal Dri2 to turn on the another set of switches M2, M4, M6) when a voltage across two terminals of a switch of the primary-side switch circuit 110 is equal to zero. However, the present disclosure is not limited in this regard.

Figure 7:
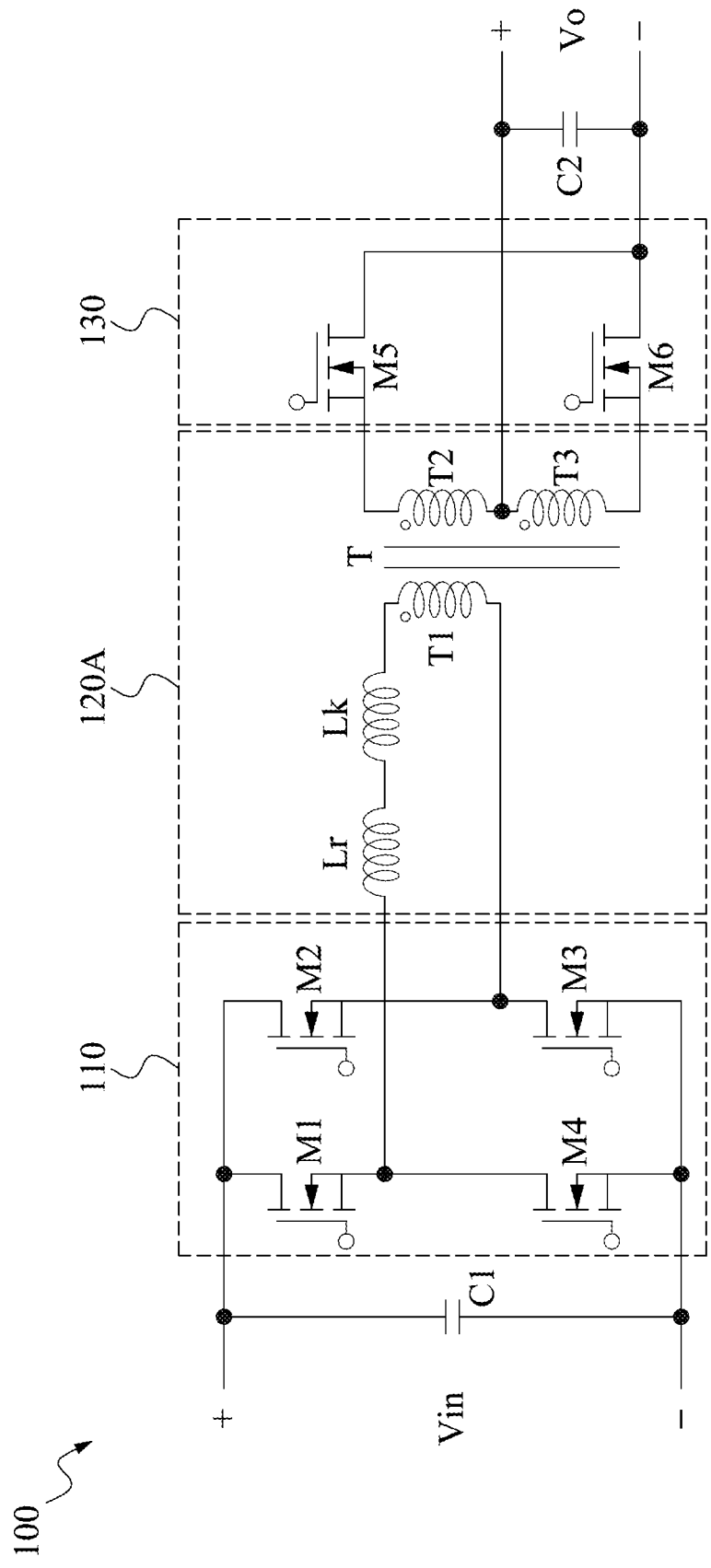
FIG. 7 depicts a schematic diagram of a circuit of a converter according to another embodiment of the present disclosure.

FIG. 7 depicts a schematic diagram of a circuit of a converter 100 according to another embodiment of the present disclosure. As illustrated by the relevant description of FIG. 1, the magnetic element circuit 120 includes an inductor, which may be the leakage inductor Lk of the transformer of the magnetic element circuit 120 shown in FIG. 2 or an external inductor Lr of a magnetic element circuit 120A shown in FIG. 7, so as to oscillate with the input capacitor C1 to generate an oscillating current. In one embodiment, the external inductor Lr is connected in series with the at least one primary-side winding T1 of the transformer and the primary-side switch circuit 110 and a required oscillating current may be generated by the input capacitor C1 together with the external inductor Lr and the leakage inductor Lk. Under the circumstances, the computing formula for the capacitance value of the input capacitor C1 is as follows:

$$C1 = \frac{1}{(Lk + Lr)(2n\pi fsw)^2} \qquad \text{Formula 2}$$

The oscillating frequency can be n times the switching frequency, wherein a range of n is [2m+1.5, 2m+2.5], here m≥0, and m is an integer. Moreover, the optimum efficiency of the converter 100 can also be achieved through fine-tuning the input capacitor C1 to satisfy the frequency relationship.

Figure 8:
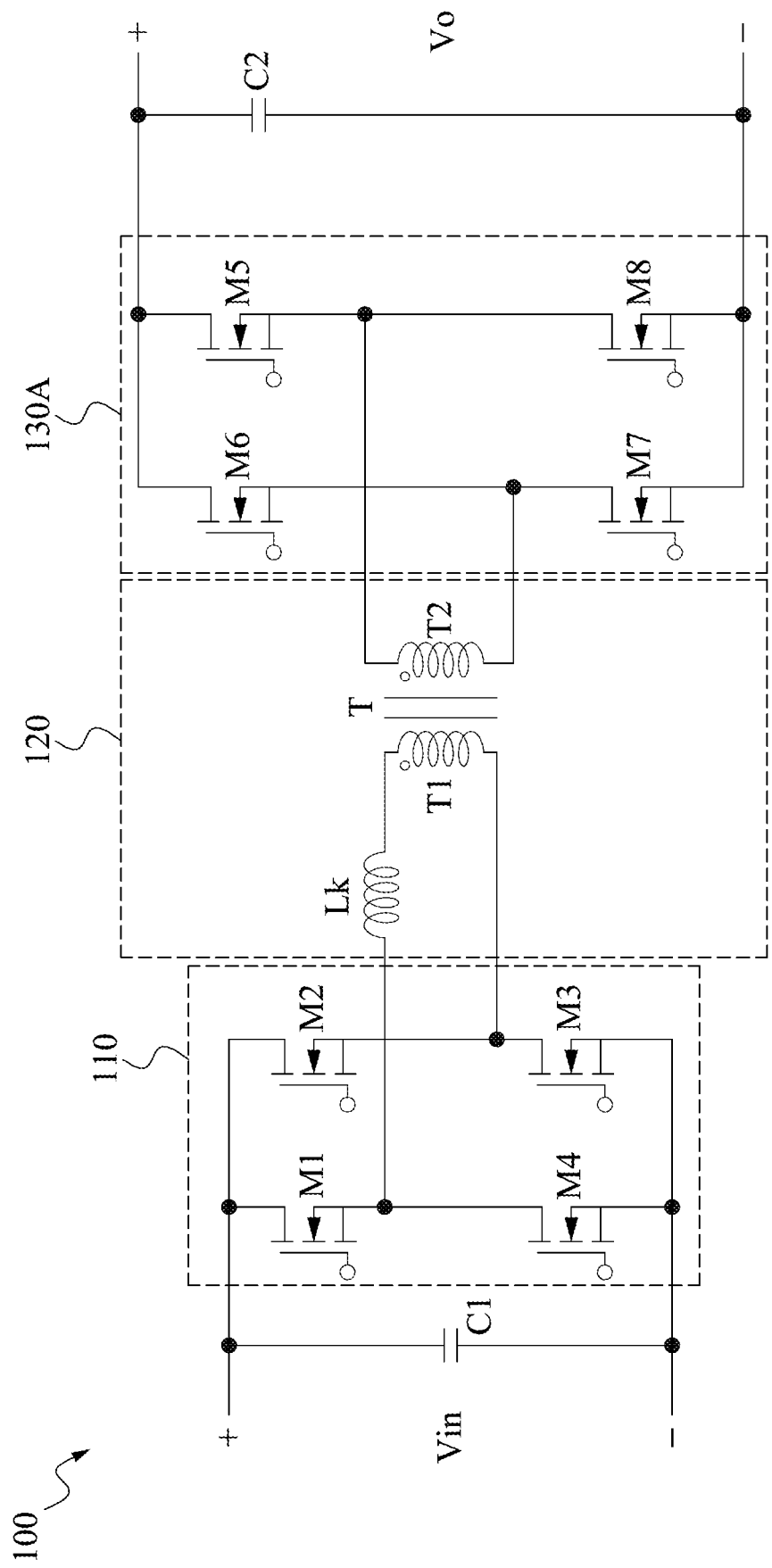
FIG. 8 depicts a schematic diagram of a circuit of a converter according to still another embodiment of the present disclosure.

FIG. 8 depicts a schematic diagram of a circuit of a converter 100 according to still another embodiment of the present disclosure. As compared with the converter 100 shown in FIG. 2, a secondary-side switch circuit 130A of the converter 100 shown in FIG. 8 may be implemented by using a full bridge rectifier circuit. Since the operations of the remaining elements with the same reference numbers are the same as those of FIG. 2, a description in this regard is not provided. In addition to that, the present disclosure is not limited to the structure shown in FIG. 8, which is only used to illustrate one of the implementation methods of the present disclosure by taking an example.

Figure 9:
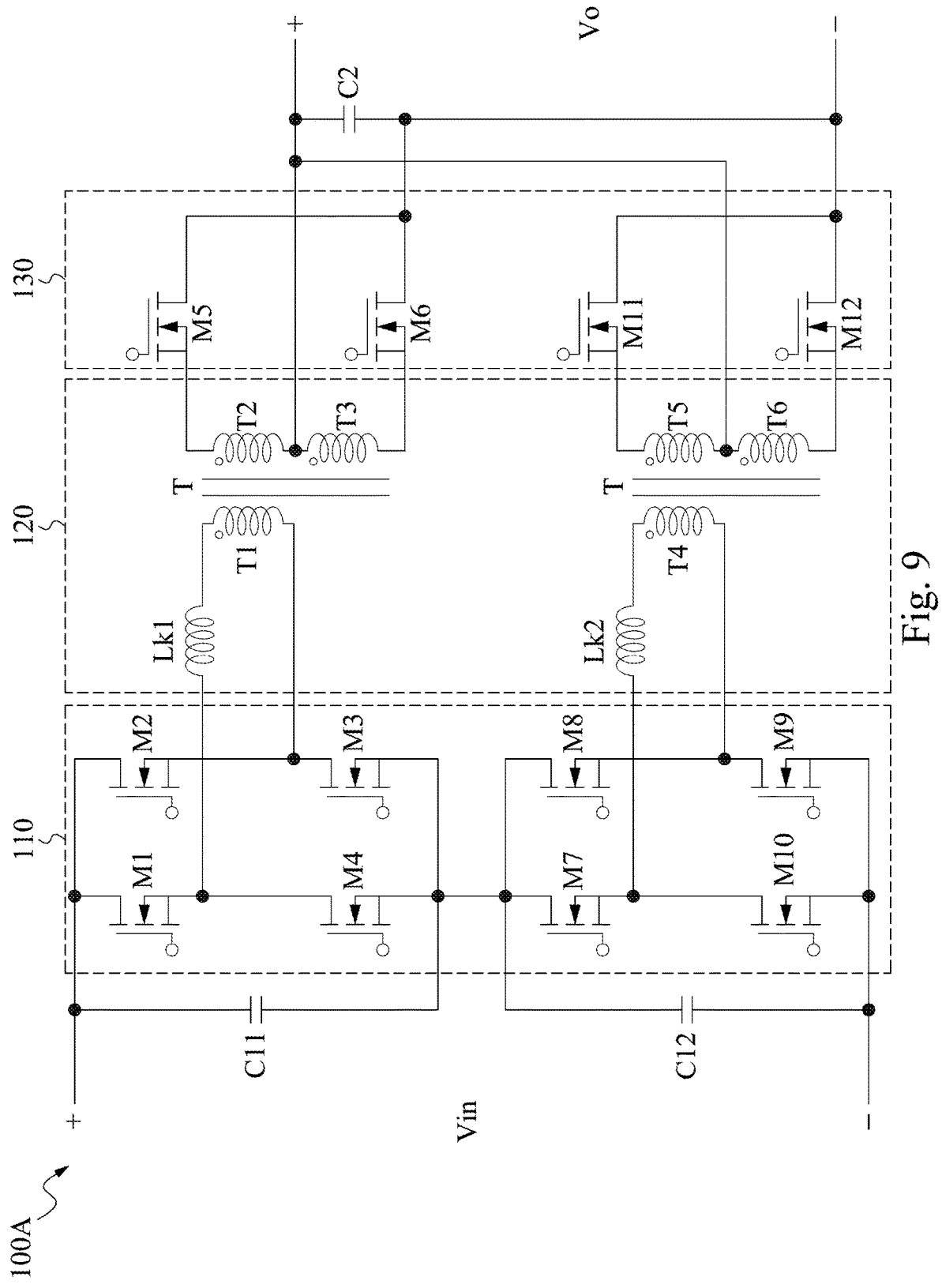
FIG. 9 depicts a schematic diagram of a circuit of a converter according to one embodiment of the present disclosure.

FIG. 9 depicts a schematic diagram of a circuit of a converter 100A according to one embodiment of the present disclosure. In the present embodiment, two converters 100 shown in FIG. 2 are adopted. The primary-side switch circuits 110 of the two converters 100 are coupled in series, while the secondary-side switch circuits 130 of the two converters 100 are coupled in parallel. The present embodiment can be applied to the occasions where the input voltage Vin is a high voltage. The structure of connecting the primary-side switch circuits 110 in series can effectively reduce voltage stress of the switches of the primary-side switch circuits 110, so that a low voltage switch can be used. Connecting the secondary-side switch circuits 130 in parallel can improve current output capability of the converter 100A, thus increasing the load capacity of the converter 100A. However, the present disclosure is not limited to the above, which is only used to illustrate one of the implementation methods of the present disclosure by taking an example. In other embodiments, the secondary-side switch circuits 130 can be configured to be coupled in series depending on practical needs.

Figure 10:
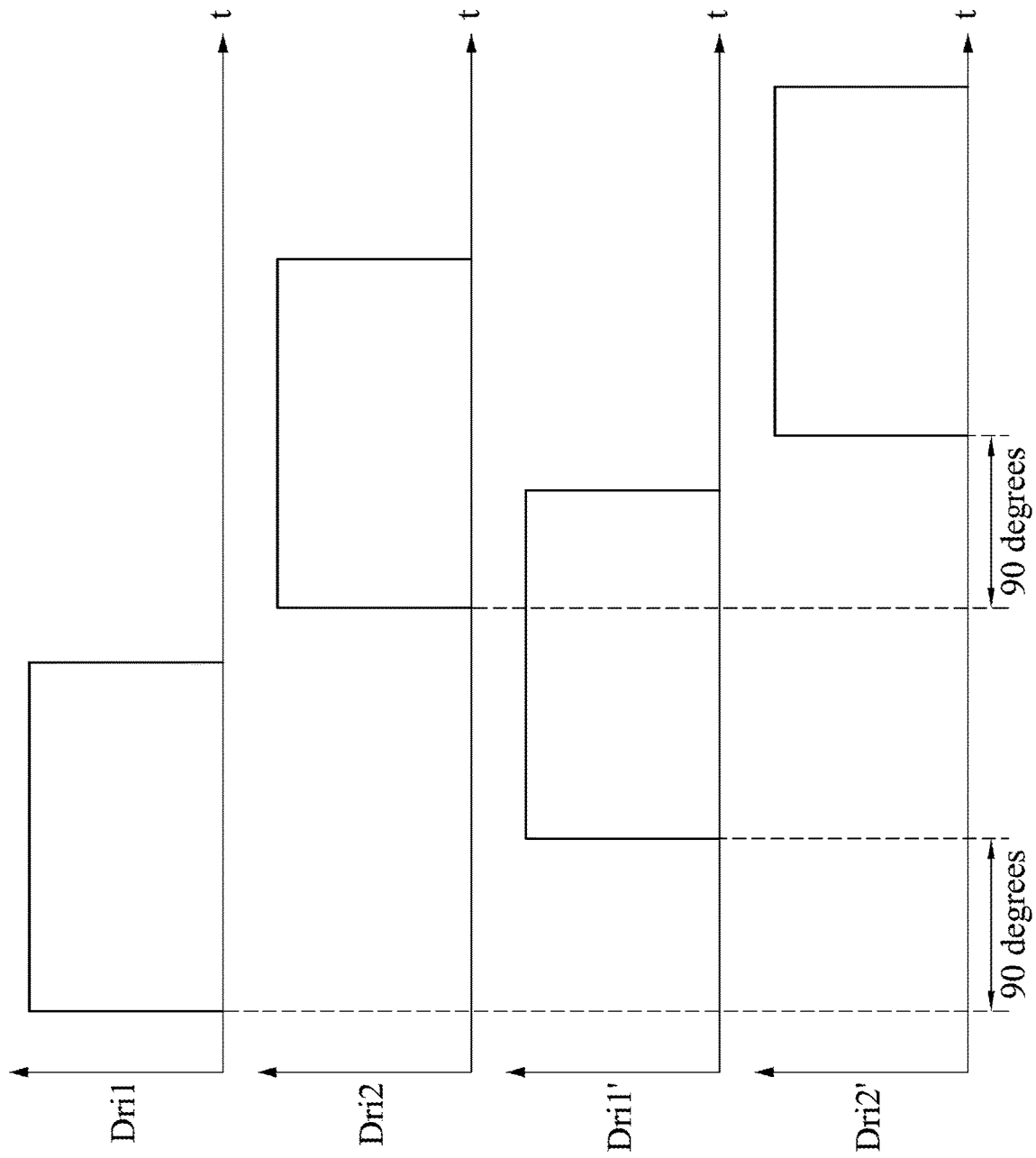
FIG. 10 depicts a control waveforms diagram of a converter according to one embodiment of the present disclosure.

In one embodiment, two input capacitors C11, C12 of the two converters 100 are connected in series. The two input capacitors C11, C12 oscillate respectively with leakage inductors Lk1, Lk2 of transformers or oscillate with an external inductor (please refer to the external inductor Lr of FIG. 7), so that the turn-on loss and conduction loss of the switches of the converter 100A are reduced. The control waveforms of the converter 100A shown in FIG. 9 may be referred to FIG. 10. As shown in the figure, two drive signals for driving the two converters 100 may be in phase or out of phase by 90 degrees (for example, drive signals Dri1 and Dri1' are 90 degrees out of phase).

Figure 11:
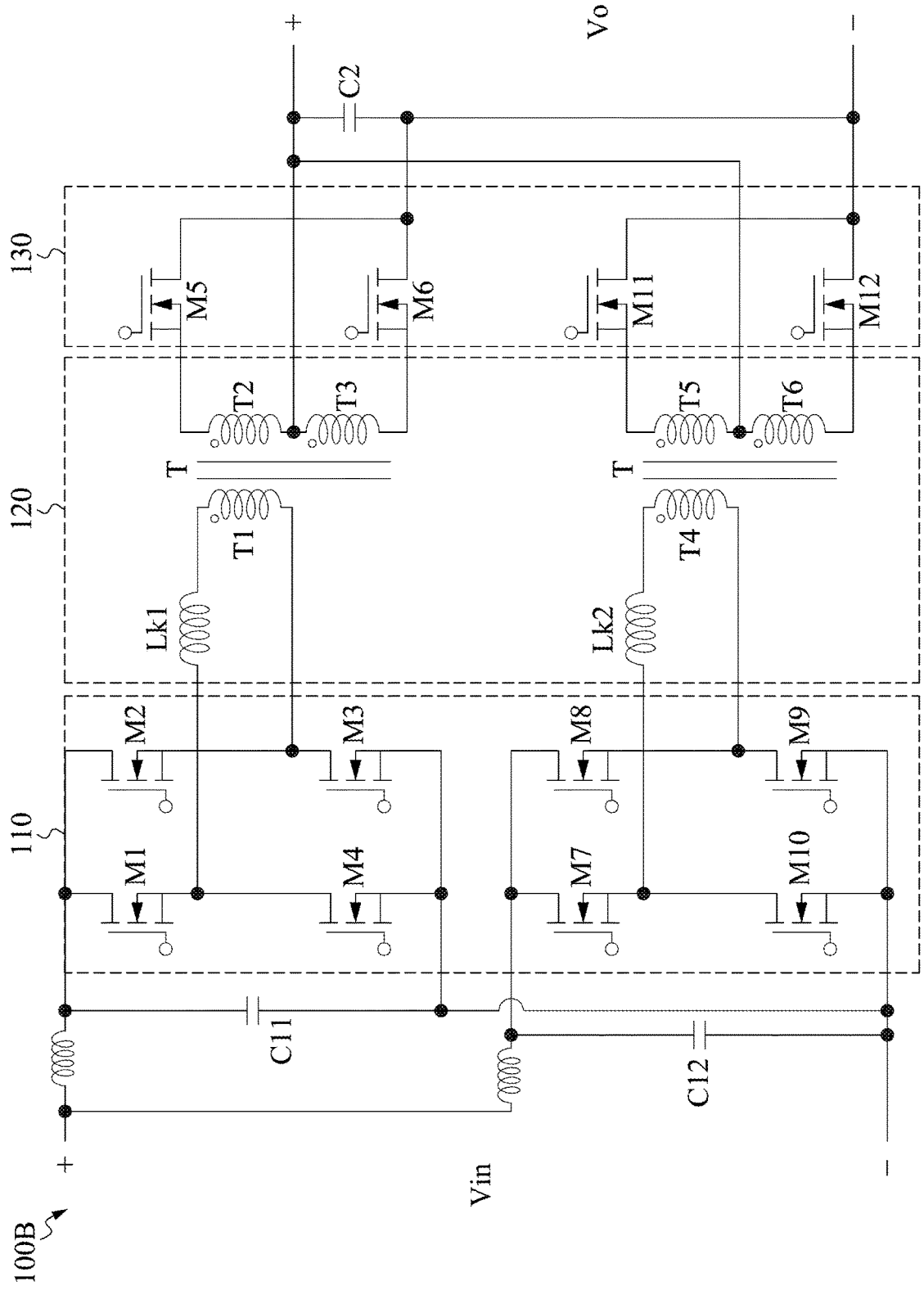
FIG. 11 depicts a schematic diagram of a circuit of a converter according to one embodiment of the present disclosure.

FIG. 11 depicts a schematic diagram of a circuit of a converter 100B according to one embodiment of the present disclosure. In the present embodiment, two converters 100 shown in FIG. 2 are adopted. The primary-side switch circuits 110 of the two converters 100 are coupled in parallel, while the secondary-side switch circuits 130 of the two converters 100 are coupled in parallel. As a result, current output capability of the converter 100B can be improved to increase the load capacity of the converter 1008. In addition, a height of the converter can be effectively decreased so as to be suitable for high-limit applications. The converter 100B shown in FIG. 11 may be driven by using the control waveforms shown in FIG. 10. As shown in the figure, two drive signals for driving the two converters 100 may be in phase or out of phase by 90 degrees. However, the present disclosure is not limited to the above, which is only used to illustrate one of the implementation methods of the present disclosure by taking an example. In other embodiments, the secondary-side switch circuits 130 can be configured to be coupled in series depending on practical needs.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A converter for converting power from an input source to a load, comprising:
   an input capacitor configured to receive an input voltage from the input source;
   a primary-side switch circuit coupled to the input capacitor and comprising a plurality of switches;
   a magnetic element circuit coupled to the primary-side switch circuit, comprising:
      a transformer and an inductor, wherein the inductor is a leakage inductor of the transformer or an external inductor coupled between the transformer and the primary-side switch circuit;
   a secondary-side switch circuit coupled to the magnetic element circuit; and
   an output capacitor coupled to the secondary-side switch circuit;
   wherein the input capacitor and the inductor oscillate to generate an oscillating current by turning on and turning off the primary-side switch circuit, and at least one switch of the primary-side switch circuit is turned off at a specific region of the oscillating current, wherein a wave trough is located in the specific region of the oscillating current.

2. The converter of claim 1, wherein the wave trough is located at a midpoint of the specific region, and an interval of the specific region has a duration which is a half of an oscillating period of the oscillating current.

3. The converter of claim 1, wherein the transformer of the magnetic element circuit comprises:
at least one magnetic core;
at least one primary-side winding coupled to the primary-side switch circuit; and
at least one secondary-side winding coupled to the secondary-side switch circuit, wherein the at least one primary-side winding and the at least one secondary-side winding are coupled through the at least one magnetic core, wherein the external inductor is connected in series with the at least one primary-side winding of the transformer and the primary-side switch circuit.

4. The converter of claim 1, wherein the primary-side switch circuit comprises a full bridge circuit.

5. The converter of claim 1, wherein the transformer comprises at least one secondary-side winding, the at least one secondary-side winding of the transformer comprises at least two windings connected in series and a center tap existed in a connection point between the at least two windings, wherein the at least one secondary-side winding of the transformer and the secondary-side switch circuit form a center-tap full wave rectifier circuit.

6. The converter of claim 1, wherein the secondary-side switch circuit comprises a full bridge rectifier circuit.

7. The converter of claim 1, further comprising:
a control circuit configured to generate a set of complementary drive signals so as to control the primary-side switch circuit, wherein a duty cycle of each of the set of complementary drive signals is about 50%.

8. The converter of claim 7, wherein when a voltage across a switch of the primary-side switch circuit is less than or equal to half of the input voltage, the control circuit is configured to turn off at least one switch of the primary-side switch circuit.

9. The converter of claim 7, wherein when a voltage across a switch of the primary-side switch circuit is equal to zero, the control circuit is configured to turn off at least one switch of the primary-side switch circuit.

10. An apparatus for converting power comprising at least two converters as defined in claim 1, wherein primary-side switch circuits of the at least two converters are coupled in series or in parallel, and secondary-side switch circuits of the at least two converters are coupled in series or in parallel, wherein at least two drive signals for respectively driving the at least two converters are in phase or out of phase by 90 degrees.

11. A converter for converting power from an input source to a load, comprising:
an input capacitor configured to receive an input voltage from the input source;
a primary-side switch circuit coupled to the input capacitor and comprising a plurality of switches;
a magnetic element circuit coupled to the primary-side switch circuit, comprising:
a transformer and an inductor, wherein the inductor is a leakage inductor of the transformer or an external inductor coupled between the transformer and the primary-side switch circuit;
a secondary-side switch circuit coupled to the magnetic element circuit; and
an output capacitor coupled to the secondary-side switch circuit;
wherein the input capacitor and the inductor oscillate to generate an oscillating current by turning on and turning off the primary-side switch circuit, wherein an oscillating frequency of the oscillating current is n times a switching frequency of the primary-side switch circuit, wherein a range of n is from (2m+1.5) to (2m+2.5), m≥0, and m is an integer, and each of the plurality of switches of the primary-side switch circuit is turned off at a specific region of the oscillating current, wherein a wave trough is located in the specific region of the oscillating current.

12. The converter of claim 11, wherein n is an even number greater than zero.

13. The converter of claim 11, wherein the transformer of the magnetic element circuit comprises:
at least one magnetic core;
at least one primary-side winding coupled to the primary-side switch circuit; and
at least one secondary-side winding coupled to the secondary-side switch circuit, wherein the at least one primary-side winding and the at least one secondary-side winding are coupled through the at least one magnetic core, wherein the external inductor is connected in series with the at least one primary-side winding of the transformer and the primary-side switch circuit.

14. The converter of claim 11, wherein the primary-side switch circuit comprises a full bridge circuit.

15. The converter of claim 11, wherein the transformer comprises at least one secondary-side winding, the at least one secondary-side winding of the transformer comprises at least two windings connected in series and a center tap existed in a connection point between the at least two windings, wherein the at least one secondary-side winding of the transformer and the secondary-side switch circuit form a center-tap full wave rectifier circuit.

16. The converter of claim 11, wherein the secondary-side switch circuit comprises a full bridge rectifier circuit.

17. The converter of claim 11, further comprising:
a control circuit configured to generate a set of complementary drive signals so as to control the primary-side switch circuit, wherein a duty cycle of each of the set of complementary drive signals is about 50%.

18. The converter of claim 17, wherein when a voltage across two terminals of a switch of the primary-side switch circuit is less than or equal to half of the input voltage, the control circuit is configured to turn off at least one switch of the primary-side switch circuit.

19. The converter of claim 17, wherein when a voltage across two terminals of a switch of the primary-side switch circuit is equal to zero, the control circuit is configured to turn off at least one switch of the primary-side switch circuit.

20. An apparatus for converting power comprising at least two converters as defined in claim 11 wherein primary-side switch circuits of the at least two converters are coupled in series or in parallel, and secondary-side switch circuits of the at least two converters are coupled in series or in parallel, wherein at least two drive signals for respectively driving the at least two converters are in phase or out of phase by 90 degrees.

21. The converter of claim 1, wherein each of the plurality of switches of the primary-side switch circuit is turned off at a trough of the oscillating current.

22. The converter of claim 11, wherein the wave trough is located at a midpoint of the specific region, and an interval of the specific region has a duration which is a half of an oscillating period of the oscillating current.

* * * * *